United States Patent [19]

Durenec

[11] 4,411,436

[45] Oct. 25, 1983

[54] SPRING LOADED PISTON SEAL ASSEMBLY

[75] Inventor: Peter Durenec, Annandale, Va.

[73] Assignee: The United States of America as represented by the Secretary of the Army, Washington, D.C.

[21] Appl. No.: 365,219

[22] Filed: Apr. 5, 1982

[51] Int. Cl.³ .............................. F16J 9/06; F16J 9/22
[52] U.S. Cl. ..................................... 277/53; 277/119; 277/175; 277/224
[58] Field of Search ............. 277/116.2, 117, 119–122, 277/223, 224, 118, 216, 53, 193, 196, 61, 62, 63, 141, 175, 142, 148, 190, 191

[56] References Cited

U.S. PATENT DOCUMENTS

| 621,817 | 3/1899 | Hopkins | 277/118 |
| 2,931,671 | 4/1960 | Beeley | 277/120 |

FOREIGN PATENT DOCUMENTS

| 18027 | 10/1980 | European Pat. Off. | 277/224 |
| 859346 | 12/1952 | Fed. Rep. of Germany | 277/119 |
| 115698 | 5/1918 | United Kingdom | 277/119 |
| 512372 | 9/1939 | United Kingdom | 277/53 |

*Primary Examiner*—Robert S. Ward, Jr.
*Attorney, Agent, or Firm*—Robert P. Gibson; Milton W. Lee; Max L. Harwell

[57] ABSTRACT

Spring loaded seals comprised of two resting rings positioned in an annular groove of a piston that are pressed against the upper and lower shoulders of the groove by a corrugated spring fitted therebetween. Each resting ring has at least one free-floating sealing wedge, preferably made of ceramic material, which overlaps the outer peripheral edge thereof for sliding along the cylinder wall wherein the sealing wedges frictionally press against the cylinder wall during the stroke of the piston in one direction and release to more freely slide along the cylinder wall in the other direction. The resting rings and sealing wedges form dry seals, i.e. unlubricated sliding seals, for use in compressor devices which operate at either high or low temperatures.

19 Claims, 3 Drawing Figures

SPRING LOADED PISTON SEAL ASSEMBLY

The invention described herein may be manufactured, used, and licensed by the U.S. Government for governmental purposes without the payment of any royalties thereon.

BACKGROUND OF THE INVENTION

This invention is in the field of dry seals for pistons used in compressor devices and specifically spring biased dry seals using ceramics as the sliding material between the piston and cylinder wall.

DESCRIPTION OF THE PRIOR ART

Conventional piston rings for use in many compressor devices, such as a high-performance Stirling engine, have low heat conductivity and high thermal expansion, which reduce their service life. Stirling engine piston rings must operate without lubricants because conventional lubricants degenerate at the high operating temperatures of the working gases, such as helium, argon, or hydrogen, used in some current high performance engines which may reach temperatures of around 1600° F. The regular circular seal with a break therein, also called a lamp seal, are very sensitive to wear and the side pressure remains constant. In the present seal assembly the seals are self adjusting for wear and the side pressure changes with direction of piston movement.

SUMMARY OF THE INVENTION

The present seal assembly is comprised of a plurality of spring loaded self adjusting seals that have sealing wedges fitted to but free-floating against beveled edges on the outer periphery of resting rings to slide along the cylinder wall. The resting rings each have a labyrinth seal on its annular seating region that fits into the base of an annular groove. There may be a plurality of annular grooves in the upper portion of the piston within which there are preferably two resting rings placed with a spring biasing means positioned therebetween to bias the two resting rings against the upper and lower shoulders of each annular groove. In the preferred embodiment, the beveled edges and the sealing wedges fitted thereagainst are on opposite sides from the spring means wherein each of the two sealing wedges alternately slide along the cylinder wall by pressure from the beveled edge applying a side pressure component while moving in one direction and free-floating away from the beveled edge and cylinder wall while moving in the opposite direction.

The self adjusting seals are of the dry type, i.e. unlubricated seals, and are preferably comprised of sealing wedges made of ceramic material and the resting rings made of either a solid hard wear resistant metal or a resilient material having a hard backplate wear resistant ring upon which the spring means moves during the compression and expansion strokes.

The present seal assembly can operate in compressors, pumps, cryogenic coolers, and internal or external combustion engines and operate in high pressures and low temperatures for long period of time without being replaced, or can operate in high temperature heat engines.

The invention will be better understood by reference to the following detailed description when considered in reference to the following drawings.

DETAILED DESCRIPTION OF THE PREFERRED EMBODIMENT

Figure 1:
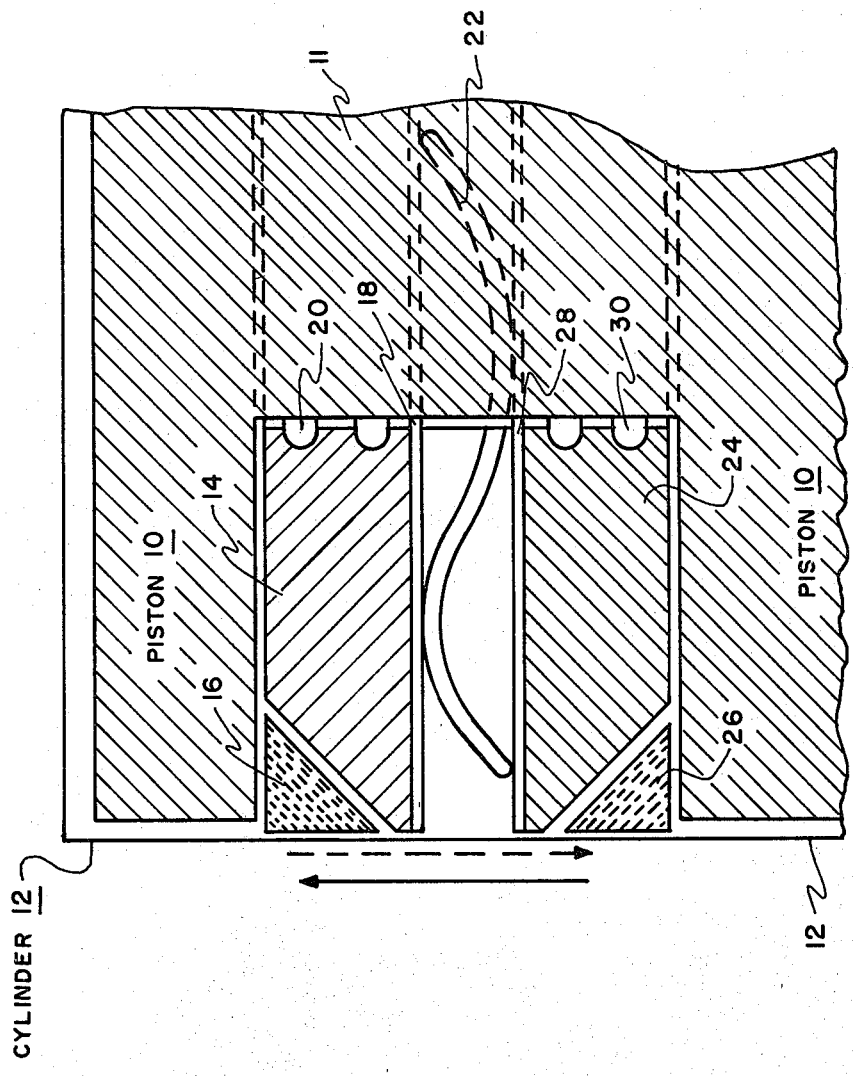
FIG. 1 is a partial cross-sectional view of a piston and the spring loaded seal inserted therein.
Figure 2:
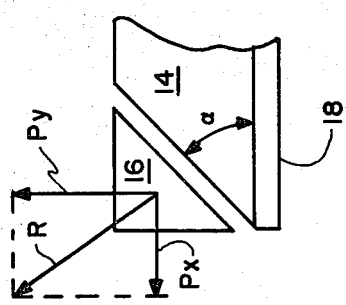
FIG. 2 illustrates diagrammatically the pressures exerted outward from one of the sealing wedges from a beveled edge.
Figure 3:
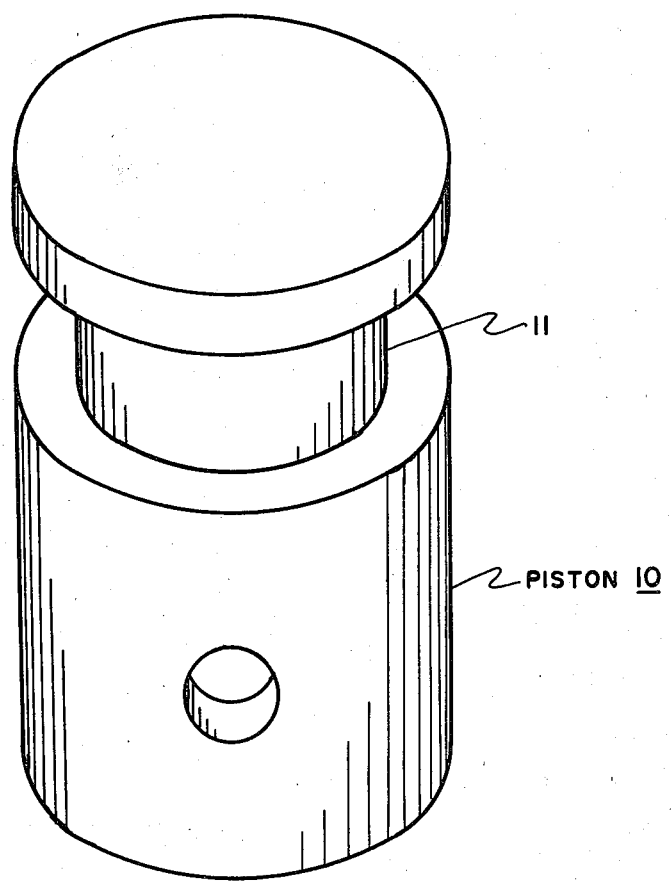
FIG. 3 shows a top portion view of the piston with one annular groove therein.

Refer now to FIGS. 1, 2, and 3 which have like representative numerals designating like or corresponding parts. The piston in which the spring loaded seal assembly is placed is represented by numeral 10 and one of the plurality of annular grooves around the upper portion of the piston is represented by numeral 11. The cylinder wall is represented by numeral 12. Only one spring loaded seal assembly is shown but it is conceivable there could be more in some instances. The assembly is comprised of a dry seal means within each annular groove 11 in which the dry seal means is comprised of two resting rings 14 and 24 having at least one beveled edge on the outer periphery and free-floating sealing wedges 16 and 26 respectively form fitted into each beveled edge thereof and labyrinth seals 20 and 30 on the annular seating region that seats into the base of said plurality of annular grooves. The assembly is further comprised of spring biasing means 22 positioned between said two resting rings 14 and 24 which biases said two resting rings against the upper and lower shoulders of each of the plurality of annular grooves.

Resting rings 14 and 24 may be made of a solid hard metallic wear resistant material, such as grey iron or brass, in direct contact with the spring biasing means 22. Alternately, the resting rings 14 and 24 may be made of resilient material, such as Rulon J or fluorocarbon, and have hard backplate wear resistant rings 18 and 28 respectively contiguous therewith and in direct contact with said spring biasing means 22. Wear resistant rings 18 and 28 may be made of brass or stainless steel. The spring biasing means 22 is preferably a corrugated spring having cylindrical ridges and hollows that alternately bias the two resting rings against the upper and lower shoulders of the annular grooved out portion. The corrugated spring is preferably made of copper berylium heat treated to maintain its spring capability under wide temperature operation of the compressor device in which the dry seal means is used. The blunt ends of corrugated spring 22 would tend to severely cut or score into the resting rings 14 and 24 if the resting rings were made of resilient materials, such as Rulon J or fluorocarbon, and the spring 22 was in direct contact therewith. Therefore, the wear resistant rings 18 and 28 are needed in these instances.

The beveled edges on the outer periphery of resting rings 14 and 24 into which the sealing wedges 16 and 26 respectively are form fitted is about 90°, i.e. angle $\alpha$ of FIG. 2 is 45°. The free-floating sealing wedges 16 and 26 are preferably made of ceramic material. Ceramics appear to be well suited as materials for dry, i.e. unlubricated, sliding seals. Some physical properties that enhance the ceramics applicability are: the very low thermal expansion, very good resistance to wear, the high fracture toughness, and the low coefficient of friction. Some ceramic materials that are suited as the sealing wedge materials are: sintered alumina ($Al_2O_3$), partially stabilized heat treated zirconia ($ZrO_2$), hot pressed silicon nitride ($Si_3N_4$), or hot pressed boron carbide ($B_4C$).

FIGS. 2 illustrates the very important side pressure component $P_x$ and the longitudinal pressure component $P_y$ that the beveled edge of 14 imposes upon the sealing wedge 16 from a resultant pressure, represented as R. As can be seen by review of FIGS. 1 and 2 the upper wedge 16 has the side pressure $P_x$ therefrom applied on the cylinder wall during the up stroke, i.e. compression stroke, but the side pressure is not present on the expansion stroke, or down stroke. The lower wedge 26 applies side pressures on the cylinder wall in an opposite phase, i.e. the side pressure is applied on the expansion stroke and is released on the compression stroke. The sealing wedges are therefore very long lasting since they are essentially only effected by friction for half the operation. The lower portion of the piston may have annular corrugations to slow down the movement of lubricants between the piston and cylinder wall to prevent lubricant egress into the compression chamber.

I claim:

1. A spring loaded piston seal assembly comprising:
   a plurality of annular grooves around the upper portion of said piston;
   a dry seal means within each of said plurality of annular grooves comprised of two resting rings having at least one beveled edge on the outer periphery and a labyrinth seal on its annular seating region which fits into the base of said plurality of annular grooves and having a free-floating sealing wedge form fitted into each of the beveled edges for sliding along a cylinder wall; and
   a spring biasing means positioned between said two resting rings which biases said two resting rings against the upper and lower shoulders of said plurality of annular grooves.

2. A seal assembly as set forth in claim 1 wherein said plurality of annular grooves is one annular groove.

3. A seal assembly as set forth in claim 2 wherein said beveled edge into which said sealing wedge is fitted is about 90°.

4. A seal assembly as set forth in claim 3 wherein said spring biasing means is a circular corrugated spring having cylindrical ridges and hollows that bias said two resting rings against said upper and lower shoulders of said plurality of annular grooves.

5. A seal assembly as set forth in claim 4 wherein said corrugated spring is preferably made of copper berylium heat treated to maintain the spring capability at a wide range of temperatures.

6. A seal assembly as set forth in claim 4 wherein said resting rings are made of a solid heat metallic material.

7. A seal assembly as set forth in claim 6 wherein said solid hard metallic material is brass.

8. A seal assembly as set forth in claim 6 wherein said solid hard metallic material is grey iron.

9. A seal assembly as set forth in claim 4 wherein said resting rings are made of resilient material having a hard backplate wear resistant ring between said resilient material and said corrugated spring to prevent wear of said resilient material.

10. A seal assembly as set forth in claim 9 wherein said resilient material is Rulon J.

11. A seal assembly as set forth in claim 9 wherein said resilient material is fluorocarbon.

12. A seal assembly as set forth in either claim 10 or 11 wherein said hard backplate wear resistant ring is brass.

13. A seal assembly as set forth in either claim 10 or 11 wherein said hard backplate wear resistant ring is stainless steel.

14. A seal assembly as set forth in claim 5 wherein said sealing wedges are made of ceramic material.

15. A seal assembly as set forth in claim 14 wherein said ceramic material is sintered alumina ($Al_2O_3$).

16. A seal assembly as set forth in claim 14 wherein said ceramic material is partially stabilized heat treated zirconia ($ZrO_2$).

17. A seal assembly as set forth in claim 14 wherein said ceramic material is hot pressed silicon nitride ($Si_3N_4$).

18. A seal assembly as set forth in claim 14 wherein said ceramic material is hot pressed boron carbide ($B_4C$).

19. A seal assembly as set forth in claim 15 wherein said dry seal means comprised of two resting rings having at least one beveled edge on the outer periphery and a free-floating sealing wedge form fitted into each of the beveled edges are one beveled edge and a free-floating sealing wedge on opposite sides of said two resting rings whereby each of the two sealing wedges alternately frictionally slide along said cylinder wall by having side pressure applied thereagainst by said beveled edge while moving in one direction and free-floats away from said beveled edge and said cylinder wall while moving in the opposite direction whereby equal pressures are maintained in the compression stroke and said sealing wedges adjust for wear while said resting rings and said sealing wedges change dimensions during wide temperature operation.

* * * * *